United States Patent [19]

Schimion

[11] Patent Number: 5,090,225
[45] Date of Patent: Feb. 25, 1992

[54] METHOD FOR COOLING AND LUBRICATING CHIPLESSLY SHAPED METALS

[75] Inventor: Werner Schimion, Hilchenbach, Fed. Rep. of Germany

[73] Assignee: SMS Schloemann-Siemag Aktiengesellschaft, Düsseldorf, Fed. Rep. of Germany

[21] Appl. No.: 423,795

[22] Filed: Oct. 18, 1989

[30] Foreign Application Priority Data

Oct. 18, 1988 [DE] Fed. Rep. of Germany ....... 3835460

[51] Int. Cl.⁵ .............................................. B21B 45/02
[52] U.S. Cl. .......................................... 72/45; 72/201; 72/42
[58] Field of Search ................ 72/41, 43, 44, 45, 200, 72/201, 236

[56] References Cited

U.S. PATENT DOCUMENTS

| | | | |
|---|---|---|---|
| 2,140,289 | 12/1938 | Hurtt et al. | 72/43 |
| 2,401,340 | 6/1946 | Dunmire et al. | 72/43 X |
| 3,150,548 | 9/1964 | Roberts | 72/43 X |
| 3,605,473 | 9/1971 | Lyon et al. | 72/43 X |
| 3,709,012 | 1/1973 | Larsonneur | 72/43 X |
| 3,802,237 | 4/1974 | Albensi et al. | 72/201 X |
| 3,837,199 | 9/1974 | Larsonneur | 72/201 X |
| 4,202,193 | 5/1980 | Wilson | 72/201 X |
| 4,315,421 | 2/1982 | Wilson | 72/42 |
| 4,467,629 | 8/1984 | Schimion | 72/201 X |
| 4,625,536 | 12/1986 | Morooka | 72/21 |

FOREIGN PATENT DOCUMENTS 0054172 6/1985 European Pat. Off. .
2038873 12/1971 Fed. Rep. of Germany .

OTHER PUBLICATIONS

Patent Abstracts of Japan, Band 6, No. 109 (M-137)(987), Jun. 19, 1982 & JP-A-57 39023 (Shin Nippon Sietetsu), Mar. 4, 1982.

Primary Examiner—Lowell A. Larson
Assistant Examiner—Michael J. McKeon
Attorney, Agent, or Firm—Toren, McGeady & Associates

[57] ABSTRACT

A method for cooling and lubricating rolls and/or the rolled material in cold rolling of metal strips in a rolling mill stand. The method includes supplying emulsifiers as necessary and emulsions which contain at least one oil phase. The emulsion is prepared immediately in front of the rolls of the rolling mill stand or immediately in front of the strip inlet into the rolling gap formed by the work rolls by separately supplying the media which form the emulsion. Subsequently, the emulsion is collected behind the rolling mill stand and the emulsion is broken up and the liquid phases are separately processed and reused for forming the initial emulsion.

7 Claims, 2 Drawing Sheets

METHOD FOR COOLING AND LUBRICATING CHIPLESSLY SHAPED METALS

BACKGROUND OF THE INVENTION

1. Field of the Invention

The present invention relates to a method for cooling and lubricating chiplessly shaped metals and the shaping means for the metals, particularly for cooling and lubricating the rolls and/or the rolled material, for example, in cold rolling of metal strips in a rolling mill stand, by supplying emulsifiers as necessary and emulsions which contain at least one oil phase. The invention further relates to an arrangement for carrying out the method.

2. Description of the Related Art

In chipless or non-cutting shaping of metals, the technological lubrication and cooling of the metals are becoming increasingly important in order to ensure that the increased requirements with respect to product quality during the production process can be met. In particular, an especially accurate maintaining of certain temperatures as well as an optimum surface geometry of rolls and rolled material are required during the shaping process of metal strip in rolling mill stands, so that a greater product quality of the rolled strip in cold rolling is ensured with respect to surface and planeness. The hydrodynamic separation of work surfaces of rolled bodies and strip surface also has an influence on the product quality. The requirements made of technological lubricants in cold rolling of fine sheet metal are generally met by emulsions having additives which are active during rolling. The effect of cooling, lubrication and force transmission in the roll gap is influenced by the rheological factors of the emulsions as well as by the addition of the emulsions when they are supplied to the roll gap. Thus, the design of the cooling and lubricating systems are of particular importance in planning and operating a cold rolling mill.

Emulsion circulating plans for cold rolling mills known in the art operate with several emulsion reservoirs, wherein the cold rolling emulsion generally is composed of a dispersion of oil in water with emulsifiers worked into the dispersion to ensure the stability of the emulsion. Each reservoir contains a cold rolling emulsion with a different emulsion characteristic. This makes it possible to supply the cold rolling mill with different cooling and lubricating media or cooling and lubricating concentrations.

Each rolling mill stand has a separate emulsion supply system composed of pump, filter and measuring and control system. The quantitative distribution of the emulsion over the width of the strip of the metal can be freely controlled by dividing the spray beams into nozzle zones. The emulsion is pumped back into the emulsion reservoirs from collection pits underneath the stands. Since each emulsion reservoir contains an emulsion with predetermined characteristic with respect to viscosity and density and with respect to cooling and lubricating properties as well as with respect to other parameters, such as, degree of dispersion, it is during the rolling operation only possible to utilize one of these predetermined emulsions. Moreover, the emulsion reservoirs must be sufficiently large because they simultaneously serve as sedimentation basins in which the preliminary cleaning of the emulsions is carried out. This means that large container constructions and complicated machines and plants of large size are required.

It has also been found that foreign contaminations can only be insufficiently removed from conventional cold rolling emulsions. Because of the foreign contamination, the emulsion is not a three-component mixture but a multicomponent mixture. The shaping process leads to metal abrasions and crack products from the oil phase. The inflow of foreign oil, for example, from leakages of the hydraulic systems, creates a multiphase mixture from which materials which negatively influence the lubricating possibility and the cleanliness of the strip can no longer be removed sufficiently and with sufficient accuracy.

It has further been found that the character and the lubricating capability of the emulsion is substantially influenced particularly by iron abrasion occurring during the shaping process which abrasion is almost exclusively adhesively bound to the oil phase. Experience has further shown that, due to insufficient sealing systems between the individual stands or in a multiple stand cold rolling mill, it is unavoidable that emulsion is carrier from one system into the next and, thus, cancel the different effects of the emulsions. The continuous circulation of a premixed emulsion also changes the inner structure and the lubricating capability of the emulsion.

European patent 0 054 172 describes a method for rolling tension-free rolled strip by influencing the coefficient of friction between the strip surfaces and the rolled surfaces. Depending on the strip tensions measured behind the rolling mill stand, in addition to the rolling oil emulsion sprayed onto the rolling gap, a basic rolling oil is applied to the surface of the rolled strip before the strip enters the rolling mill stand. The additional application of basic oil on the rolled strip made it possible to influence the planeness of the cold rolled strip.

However, it is only possible to meet today's great requirements with respect to product quality of cold rolled sheet metal and particularly the demands of rolling mill operators for a greater output of cold rolled steel strip in a cold rolling mill if the cooling and lubricating processes in the rolling gap or at the rolls can be influenced even more accurately and precisely than in the past. Thus, a greater quality of the product can only be ensured by a determined control/regulation of the frictions of coefficient in the gap between roll and rolled material and by means of an adjusted and deceleration-free changing of the properties of the emulsion which is supplied to the rolls.

In view of the above technological background, it is the primary object of the present invention to provide a novel cooling and lubricating system for cold rolling mills in which any desired oil concentration and any desired degree of dispersion in the emulsion can be adjusted at any time and with as little time delay as possible. It is to be made possible that the oils used are mixed in a predetermined manner with components which are active during rolling. In addition, an improved cleaning of the media collected behind the rolling mill is to be ensured by separately processing and cleaning the liquid phases which have been separated from the used emulsion. The size of the container structures and the machines required for cleaning and supplying the cooling and lubricating media are to be reduced and the use of emulsifiers which influence the environment is also to be reduced.

SUMMARY OF THE INVENTION

In accordance with the method of the present invention, the emulsion is prepared immediately in front of the rolls of the rolling mill stand or immediately in front of the strip inlet into the rolling gap formed by the work rolls by separately supplying the media which form the emulsion, and, after performing the cooling and lubricating function, the emulsion is collected behind the rolling mill stand and the emulsion is broken up or demulsified and the liquid phases separated in this manner are separately processed and reused for forming the initial emulsion.

The separate supply of the media which form the emulsion and which are combined only immediately in front of the rolling mill stand into the desired emulsion and which after performing the cooling and lubricating function are again separated, provides several advantages.

It has been found that the thickness of the lubricating film during rolling of the rolls on the almost plane rolled strip is a factor which predominantly determines the surface quality of cold rolled strip steel. The building up of a lubricating film thickness adjusted to the respective rolling procedure depends on several factors, wherein the lubricant factor can now be favorably influenced. This lubricant factor is determined by the viscosity of the lubricant, the mixing ratio of lubricant and water and the degree of dispersion of the lubricant in water. Thus, the steps of the method according to the present invention make it possible to influence or change quickly and continuously the lubricating film thickness in certain rolling gap areas. This makes it possible to influence the hydrodynamic pressure field between the work surfaces and the rolling gap during cold rolling of metal strip.

The product quality of the metal strip with respect to surface quality and planeness and the product throughput can be influenced quickly by supplying to the rolling mill a cooling and lubricating emulsion whose viscosity, concentration, stability, etc. is adapted to the respective rolling procedure. The concentration of the emulsion is adjustable within wide ranges depending upon the predetermined rolling and operating conditions, namely between an oil portion of greater or equal zero % and smaller or equal hundred %.

Additional advantages are obtained with respect to the emulsion processing because, due to the absence of or the use of small quantities of environmentally damaging emulsifiers, the water and used oil treatment is inexpensive and yields few harmful substances, particularly if the circulating oil or circulating water used for the preparation of emulsion must be partially discarded. The method of the invention does not require certain emulsifiers because the stability of the emulsion prepared in the immediate vicinity of the rolling mill stand can be lower as compared to conventional emulsion circulating plants with large emulsion basins which are arranged a great distance away from the rolling mill stand.

It is particularly advantageous to adjust the characteristic properties of the emulsion in accordance with the operating conditions determined by the rolling process, particularly in accordance with the determined partial tensile stresses in the rolled strip, or in accordance with the bite conditions in the rolling gap which are determined by the difference of the circumferential speed of the roll and the speed of the strip, and to control the characteristic properties of the emulsion by selecting the quantity and type of the media to be emulsified and by selecting an emulsifying procedure.

In accordance with a further development of the invention, the emulsion is an oil-in-water emulsion which may contain emulsifiers for controlling the characteristic properties of the emulsion, wherein the oil and water components are initially separately heated and/or cooled and are supplied at a predetermined constant temperature and under high pressure to a dispersing unit and the resulting dispersion is sprayed immediately subsequently onto the surface of the rolls and/or into the rolling gap and/or onto the rolled strip. Thus, it is possible to influence in a predetermined manner and separately the three tasks of the cooling and lubricating agent has to perform, namely, lubricating, cooling and keeping clean the rolls and the rolled strip. This results in a rolling situation in which all three tasks of the cooling and lubricating agent are met independently of each other in the best possible and desired manner.

In accordance with another feature of the invention, the emulsion which is sprayed onto the rolls, particularly onto the back-up rolls of the rolling mill stand, has a lower lubricating power as compared to the emulsion which is sprayed into the rolling gap. This is desirable, for example, if the contact zone between the back-up roll and the work roll is to be lubricated less efficiently as compared to the shaping zone in the rolling gap, so that the back-up roll 5 can transmit the circumferential force to the work roll without slippage.

In accordance with a particularly advantageous feature of the invention, the characteristic properties of the emulsion sprayed into the rolling gap is controlled along the roll axis with respect to time and/or with respect to certain zones. This makes it possible to influence particularly effectively the planeness of the rolled metal strip.

In accordance with another development of the invention, the used emulsion which is collected behind the rolling mill stand is conducted to a separating zone for demulsifying, wherein turbulences due to pumping and flow influences are essentially avoided and demulsifiers may be added. Thus, all oil-in-water mixtures can flow in a free fall and in an essentially laminar flow into a simply constructed collecting basin arranged underneath the rolling mill stand, so that the separation of the substances in the separating zone or the breaking-up of the emulsion is carried out relatively quickly. This makes it possible to use a smaller and less expensive separating basin. If it is not possible to provide a free fall for the oil-in-water mixtures, relatively inexpensive, low-turbulence pumps can be used, for example, in the form of channel wheel pumps, preferably of the single-vein wheel construction.

In accordance with a further development of the invention, the oil phase separated in the separating zone is again stabilized and a mixed phase which still may contain water is returned into the separating zone, while the purified oil phase is conducted to the dispersing unit.

In accordance with another feature, the separated water phase is filtered and again stabilized and a mixed phase which may still contain oil phase is returned into the separating zone, while the purified water phase is conducted to the dispersing unit. Because of the separate purification of the oil phase and of the water phase, the foreign materials contained in these phases can be removed much more simply and effectively and the water phase and the oil phase maintain constant properties over a long period of use. In this manner, the iron abrasions resulting from the shaping process can be removed particularly effectively almost completely from the circulating oil. In the past, the iron abrasions were a particularly disadvantageous influence on the character and the lubricating capability of the emulsion.

In accordance with another further development of the invention, the circulating oil and the circulating water used for preparing the emulsion are replenished by the addition of fresh oil or fresh water, respectively, so that a long period of use of the media water and oil which form the emulsion is ensured in a particularly simple manner. Advantageously, the emulsifiers which control the properties of the emulsion are initially dissolved in the fresh oil phase or the fresh water phase. It is apparent that this makes it possible to adjust particularly quickly the desired characteristic properties of the emulsion. This is particularly true if several containers with differently mixed emulsifiers are available. In accordance with another advantageous feature, the oil phase is sprayed together with emulsifiers under pressure into the water phase in the dispersing unit.

In accordance with another further development of the invention, a basic rolling oil, for example, a pure kerosene, is supplied to at least a portion of the emulsion nozzles for the rolling gap without being conducted to the dispersing unit. As a result, under extreme rolling conditions, such as, the rolling of foils having a thickness of a few micrometers, rupturing of the foil is prevented.

In accordance with the arrangement of the present invention for carrying out the above-described method, dispersing units are arranged in the vicinity of the rolls of the rolling mill stand and/or the rolling gap. Connected to each dispersing unit are pressurized lines for a water phase and an oil phase which may contain at least one emulsifier. The dispersing unit is connected to spray nozzles for the emulsion which are distributed over the length of the rolls. A collecting basin is arranged underneath the rolling mill stand. The collecting basin is connected to containers for demulsifying the used emulsion and to containers for separately processing the oil and water components of the emulsion. The containers, in turn, are connected to a dispersing unit through return lines for the separated liquid phases oil and water.

Although the above-described emulsion circulating system provides an optimum cooling and lubricating system for obtaining an even higher product quality, the system can be constructed smaller and less expensively as compared to conventional systems. The container size can be reduced and the necessary machines can be simpler.

The properties of the emulsion to be prepared can be adjusted in a particularly simple manner if a heat exchanger or a heating device and a pressure pump are arranged in the return lines for the separated liquid phases oil and water. For monitoring the oil concentration and the degree of dispersion of the emulsion, a measuring device is advantageously arranged in the emulsion line behind the dispersing unit which measuring device is connected to a control device and appropriate adjusting units for the pressure and the temperature in the return lines for pure oil and pure water.

In accordance with another advantageous feature of the emulsion circulating system of the present invention, several emulsion nozzles are combined in zones along the roll axis and/or underneath and above the rolled strip. The nozzle zones are connected to a dispersing unit which includes a measuring and regulating device. Each individual dispersing unit may simultaneously be the spray nozzle for the emulsion and a plurality of such dispersing units may be arranged on spray beams immediately in front of the rolls or in front of the rolling gap of the rolling mill stand. It is particularly advantageous if the control device for pressure and temperature in the pure oil lines and in the pure water lines is connected to a tensile stress measuring unit arranged behind the rolling mill stand and transversely of the rolled strip.

The emulsion circulating system according to the invention makes it possible to optimize the adjustment of certain lubricating and cooling properties of the emulsion to each rolling process. The dispersing unit produces the desired degree of dispersion, i.e., a certain size of oil droplets and a uniform distribution of these droplets in the flow of water immediately where the desired properties of the emulsion are necessary for the rolling procedure.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
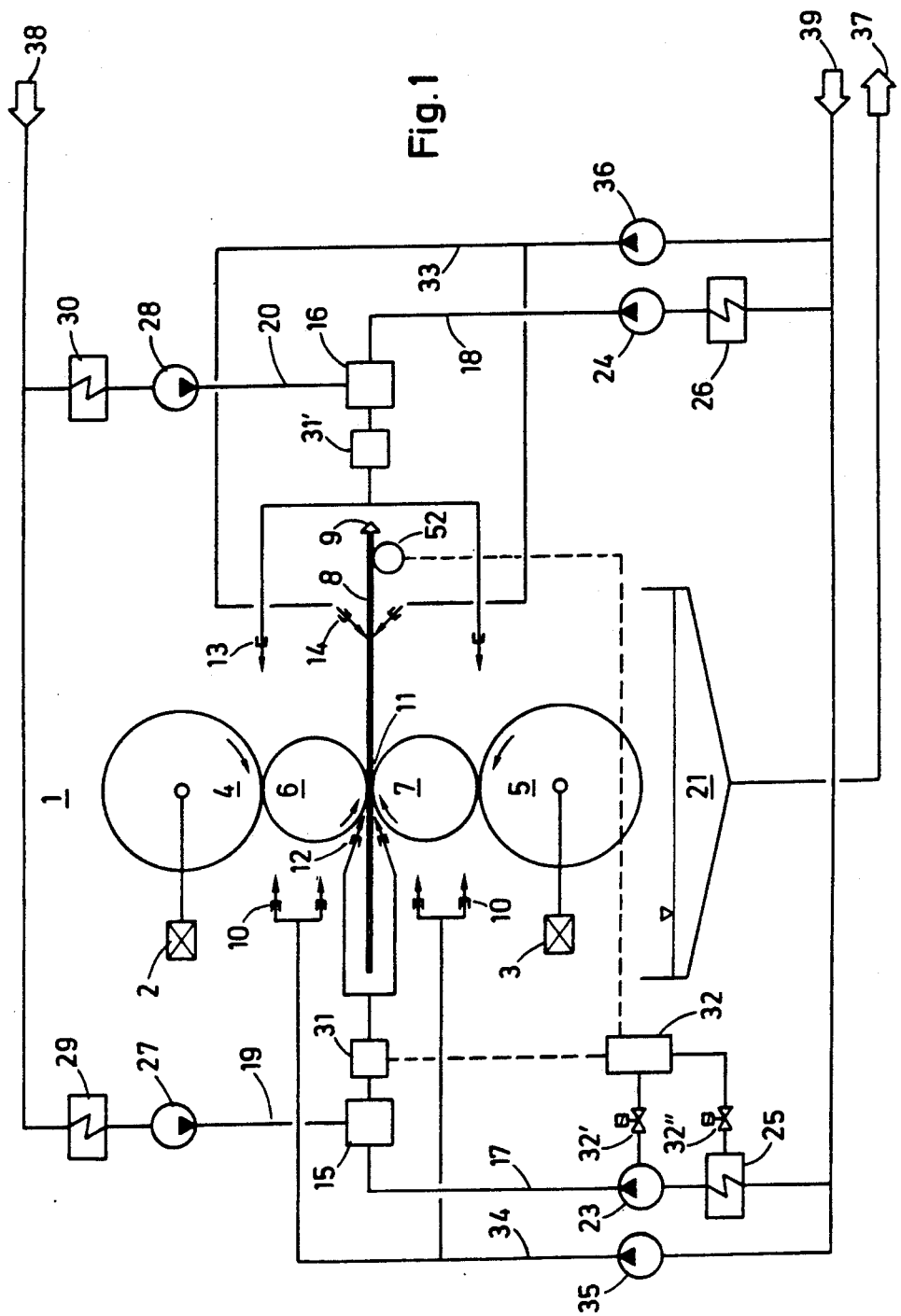
FIG. 1 is a schematic diagram of a cold rolling mill stand with back-up roll drive and emulsion circulating system.
Figure 2:
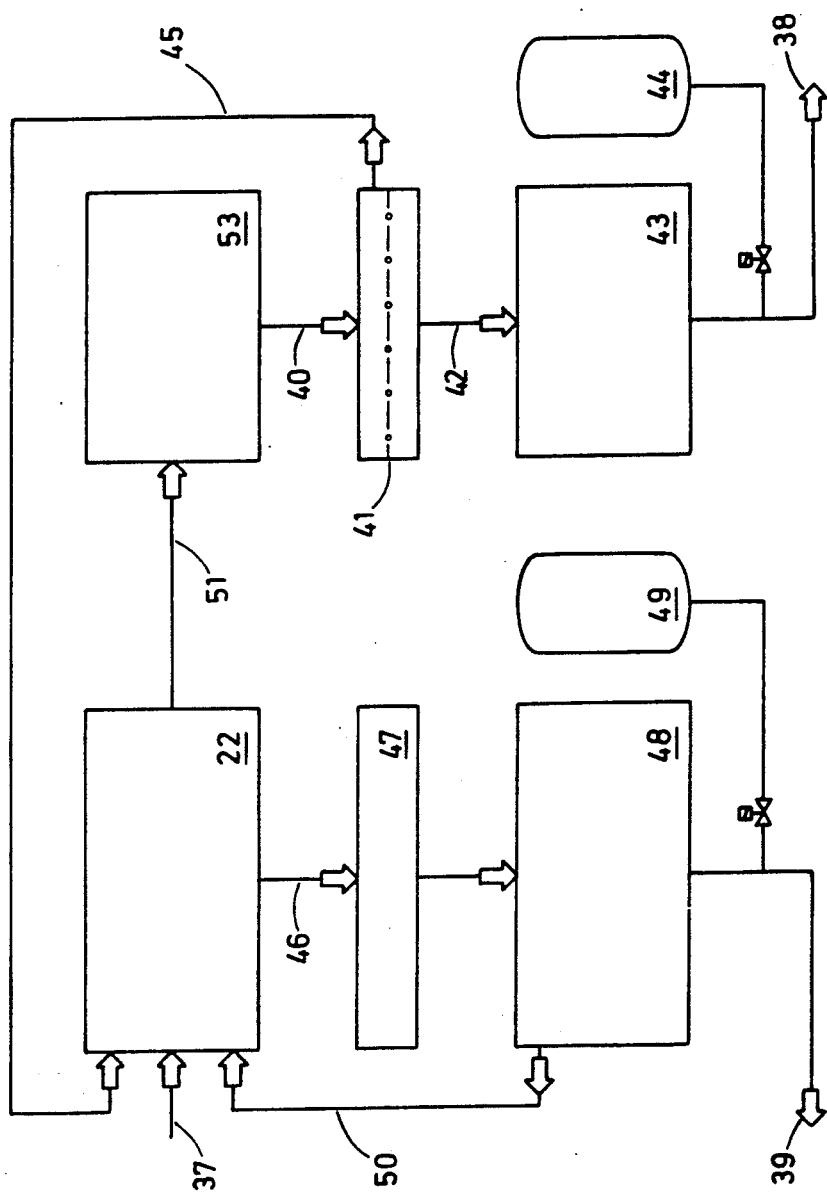
FIG. 2 is a schematic diagram of a unit for processing the used rolling emulsion.

FIG. 1 of the drawing shows a cold rolling mill stand 1 with back-up roll drives 2 and 3. FIG. 2 shows the arrangement of containers in which the emulsion is separated into water and oil and in which the water and oil are separately stored and processed with the use of water and cleaning apparatus.

As illustrated in FIG. 1, the cold rolling mill 1 with back-up roll drives 2 has two back-up rolls 4, 5 and two rolls 6, 7 between which is rolled a metal strip 8 in the direction indicated with arrow 9. Spray nozzles 10 for cooling water are provided at the inlet of the rolling mill stand 1. The spray nozzles 10 are mounted on a spray beam, not illustrated. Immediately in front of the rolling gap 11 and in the inlet zone of the rolled strip 8 into the rolling mill stand 1, emulsion nozzles 12 are arranged above and below the rolled strip. Emulsion nozzles 12 are also mounted on spray beams, not shown. Additional emulsion nozzles 13 are provided behind the rolling mill stand 1 seen in rolling direction 9 of the rolled strip 8. Emulsion nozzles 13 are directed toward the zones of contact between the work roll 6 and back-up roll 4 and between the work roll 7 and back-up roll 5. Additional spray beams with spray nozzles 14 are arranged above and below the rolled strip at a short distance behind the rolling mill stand.

Dispersing units 15 and 16 are arranged in the vicinity of the back-up rolls 4, 5 of the rolling mill stand 1 and in the vicinity of the rolling gap 11 formed between the work rolls 6, 7. A pressurized line 17, 18 for the water phase and a pressurized line 19, 20 for the oil phase with at least one emulsifier are each connected to one of the dispersing units 15 and 16. Measuring devices 31 for monitoring the oil concentration and the degree of dispersion of the emulsion are arranged between the dispersing units 15, 16 and the emulsion nozzles 12, 13 which are supplied with emulsion from the dispersing unit. A collecting basin 21 for the water-oil mixtures from the rolling mill stand is arranged underneath the rolling mill stand. The collecting basin 21 is connected to the a collecting and separating container 22 for emulsifying the used emulsion.

A pump 23, 24 each and a heat exchanger or heating device 25, 26 each are arranged in the pressurized lines 17, 18 for the prepared water phase. Oil drums 27, 28 and heat exchanger 29, 30 are also arranged in the pressurized lines 19, 20 for the oil phase. The measuring device for monitoring the oil concentration and the degree of dispersion of the emulsion arranged in the emulsion line behind the dispersing unit 15 is connected to a control device 32 and appropriate adjusting units 32' and 32" for the pump 23 and for the heating device or heat exchanger 25. The control device 32 is connected to a tensile stress measuring unit 52 which is arranged behind the rolling mill stand 1 and transversely of the rolled strip 8. Similar control circuits are provided in the pressurized line 18 for the water phase and in the pressurized lines 19, 20 for the oil phase. The spray nozzles 10 and 14 are connected to water lines 33, 34 in which are arranged pressure pumps 35, 36. The system illustrated in FIG. 1 is supplied with purified circulating oil from the pure oil line 38 and from the pure water line 39 and the circulating oil is removed through line 37 for an oil-water mixture which is connected to the collecting basin 21.

As illustrated in FIG. 2, the oil-water mixture line 37 leads into the collecting and separating container 22. A line 51 for the oil phase leads from the collecting and separating container 22 to an oil-collecting container 53, the outlet line 40 of which is connected to an oil purifying plant 41. The oil purifying plant 41 additionally serves to perform a residual water separation. The purified oil is conducted from oil purifying plant 41 through a connecting line 42 to a pure oil container 43 to which is connected a pure oil line 38 which, as illustrated in FIG. 1, is connected to the dispersing units 15 and 16. The pure oil line 38 is additionally connected to a line from the fresh oil container 44. A mixed phase which contains water is conducted from the oil purifying plant 41 through return line 45 to the collecting and separating container 22.

As further illustrated in FIG. 2, a pressurized line 46 for conducting the water phase leads from the collecting and separating container 22 for the used emulsion to a water collecting container 48. A filter 47 is arranged in line 46. An outlet line 39 of the water collecting container 48 is connected to dispersing units 15, 16, as can be seen in FIG. 1. Another line is provided for connecting the pure water line 39 with the fresh water container 49. An outlet line 50 conducts a mixed phase containing oil from the pure water container back to the connecting and separating container 22.

The emulsion used for rolling is prepared in the immediate vicinity of the rolling gap by initially increasing the pressure of the water to a desired pressure by means of a pump 23 arranged in the pressurized line 17 for the water phase. A heat exchanger 25 or an appropriate heating device is used for obtaining the desired water temperature for the subsequent adjustment of certain viscosity properties of the emulsion to be prepared. A certain quantity of oil is removed from the pure oil lines created by means of pump 27, the oil is heated in the heating device 29 to certain temperature and is sprayed at high pressure into the dispersing unit 15. The dispersing unit is used for obtaining the desired degree of dispersion, i.e., a certain size of the droplets and the uniform distribution of the oil droplets in the water. The dispersion prepared in this manner is now sprayed directly into the rolling gap. This is done by means of several emulsion nozzles 12 which may be combined into zones and which are arranged on a spray beam above and below the rolled strip 8.

The oil concentration and the degree of dispersion are continuously monitored by a measuring device 31. A control device 32 actuates adjusting units 32', 32" of the pressure pump 23 and of the heating device 25, respectively, in accordance with the tensile stresses of the rolled strip measured by the measuring unit 52 and by taking into account the desired values. In the same manner, the measuring device 31 is connected to a control device which is not shown and to adjusting units of the pressure pump 27 and the heating device 29 which are both arranged in the pressurized line for the oil phase. Of course, it is also possible to prepare different oil concentrations and degrees of dispersion for the spray beams above and below the rolled strip 8.

The lubricating emulsion for the contact zone between the back-up; roll and the work roll is prepared in the same manner as described above. The emulsion is dispersed in the dispersing unit 16 by means of the pump 24 and the heating device 26 for the pure water and by means of the pressure pump 28 and the heating device 30 for the oil phase. the emulsion is sprayed by the emulsion nozzles 13 toward the contact zone between the back-up roll and the work roll. The emulsion sprayed into the rolling mill stand at this location intentionally has a lower oil concentration and, thus, a poorer lubrication as compared to the emulsion used in the shaping zone, so that the back-up roll 4 and the work roll 6 or the back-up roll 5 and the work roll 7 do not slip relative to each other. The oil concentration and the degree of dispersion are controlled as described above by means of a measuring device 31' and corresponding control device, not illustrated in detail.

The work rolls 6, 7 and the rolled strip 8 are sufficiently cooled if only the pure water phase is supplied at a certain pressure to the rolls through the spray nozzles 10 by means of the pump 35 and the line 34. This further intensifies the cooling of rolls and strips.

It is also possible to improve the purity of the strip by drawing water from the pure water line 39 by means of pump 36 and to substantially increase the pressure of the water. Suitable nozzles 14 above and below the rolled strip 8 generate a strong jet which is directed against the rolling direction 9 and removes impurities from the surface of the strip. If grease is to be applied to the strip prior to winding, oil can be mixed into the spray water or a subsequent spray beam can be used can be for applying the desired water/oil concentration on the surface of the strip. Such an arrangement can also be provided at the inlet of the strip for lubricating sectors of the strip.

All water/oil mixtures flow into a collecting basin 21 underneath the stand 1 and are conducted from basin 21 either in a free fall or by means of pumps through the oil/water mixture line 37 into the selecting and separating container 22. It is important in this connection that pumping and low influences do not cause turbulence of the materials oil, water and dirt, in order to facilitate the subsequent emulsifying of the emulsion in the container 22.

The oil phase separated from the used emulsion in the collecting and separating container is again stabilized in an oil collecting container 53. The metal components are removed subsequently in an oil purifying unit 41 and the water is separated. The oil phase containing water is returned to the return line 45 as a mixed phase to the collecting and separating container 22 to carry out another separation. The purified oil is collected in the pure oil container 43 and fresh oil is added from the fresh oil container 44 as desired. Emulsifiers for controlling the emulsion may be added to the fresh oil. It is also possible to arrange several containers, so that the emulsion to be prepared can be controlled within wide ranges. As described above, the pure oil line 38 is connected to the dispersing units 15 and 16.

The water phase separated in the collecting and separating container 22 is purified by removing dirt particles by means of filter 47 and is collected in a pure water container and is stabilized. A mixed phase which may contain an oil phase is returned through line 50 for another phase separation to the collecting and separating container 22. The pure water, to which fresh water may be added from the fresh water container 49, is conducted through the pure water line 39 in the manner described with respect to FIG. 1 to the dispersing units 15 and 16 for preparing the emulsion The above-described emulsion circulating system according to the present invention can be used for adjusting any desired work concentration in the emulsion at any time and with extremely little time delay in accordance with the requirements of the rolling process. Since the cooling and lubricating system for cold rolling mills is highly flexible because of the short delay times, the product is improved with respect to surface qualities and planeness of the rolled strip. Moreover, the processing of the emulsion is simplified and is less of a burden on the environment. In addition, the costs of the system are lower as compared to previously known emulsion circulating systems.

While a specific embodiment of the invention has been shown and described in detail to illustrate the application of the inventive principles, it will be understood that the invention may be embodied otherwise without departing from such principles.

I claim:

1. In a method for cooling and lubricating chiplessly shaped metals and the shaping means for the metals, particularly for cooling and lubricating the rolls and/or the roller material in cold rolling of metal strips in a rolling mill stand, the method including supplying by means of emulsion nozzles emulsifiers and emulsions which contain at least one oil phase to the rolls and the rolled strip, the emulsion having characteristic properties, preparing the emulsion immediately in front of the rolls of the rolling mill stand and immediately in front of a strip inlet into a rolling gap formed by work rolls of the rolling mill stand in a dispersing unit by separately supplying the media which form the emulsion, the emulsion nozzles being directed to the rolling gap, the improvement comprising adjusting the characteristic properties of the emulsion in accordance with determined partial tensile stresses in the rolled strip and in accordance with existing bite conditions in the rolling gap as determined by the difference of the circumferential speed of the roll and the speed of the strip, and controlling the characteristic properties of the emulsion by selecting the quantity and type of the media to be emulsified and by selecting an emulsifying procedure, initially dissolving the emulsifiers in one of the fresh oil phase and the fresh water phase, spraying the oil phase together with emulsifiers under pressure into the water phase in the dispersing unit, and, after performing the cooling and lubricating function, collecting the emulsion behind the rolling mill stand, adding emulsifiers to the used emulsion and conducting the used emulsion to a separating zone for emulsifying by means of means which avoid turbulence due to pumping and flow influences, again stabilizing the oil phase separated in the separating zone, conducting any mixed phase which still contains water back into the separating zone, and conducting the purified oil phase to the dispersing unit, and filtering the separated water phase and again stabilizing the water phase, conducting any mixed phase which still contains oil back into the separating zone and conducting the purified water phase to the dispersing unit.

2. The method according to claim 1, wherein the emulsion is an oil-in-water emulsion which contains emulsifiers for controlling the characteristic properties of the emulsion, comprising initially separately heating and/or cooling the oil and water components, supplying the components at a predetermined constant temperature and under high pressure to the dispersing unit and spraying the resulting dispersion immediately subsequently onto the surface of the rolls and/or into the rolling gap and/or onto the rolled strip.

3. The method according to claim 2, wherein the emulsion sprayed onto the rolls has a lower lubricating power than the emulsion sprayed into the rolling gap.

4. The method according to claim 2, comprising controlling the characteristic properties of the emulsion sprayed into the rolling gap during a predetermined time.

5. The method according to claim 2, wherein the characteristic properties of the emulsion sprayed into the rolling gap is controlled within predetermined zones along the axes of the rolls.

6. The method according to claim 2, wherein a basic rolling oil is added to at least a portion of the emulsion sprayed into the rolling gap, wherein the dispersing unit is bypassed.

7. The method according to claim 1, wherein fresh oil is added to the oil used for the emulsion and fresh water is added to the water used for the emulsion.

* * * * *